United States Patent [19]

Punako et al.

[11] 3,742,559

[45] July 3, 1973

[54] PLASTIC CABLE SUPPORT

[75] Inventors: Stephen Punako, Bainbridge; George J. Swanson, Sidney, both of N.Y.

[73] Assignee: The Bendix Corporation, Southfield, Mich.

[22] Filed: June 25, 1971

[21] Appl. No.: 156,639

[52] U.S. Cl. .................................. 24/73, 248/74
[51] Int. Cl. .................................. A44b 21/00
[58] Field of Search .................................. 16/DIG. 5; 248/74 PB, 56, 68 R

[56] References Cited
UNITED STATES PATENTS

| 2,342,958 | 2/1944 | Morehouse | 248/74 PB X |
| 2,872,141 | 2/1959 | Hefner | 248/74 PB |
| 3,197,829 | 8/1965 | Caveney et al. | 248/74 PB |
| 3,300,163 | 1/1967 | Randolph | 248/56 |
| 3,353,774 | 11/1967 | Thomas | 248/68 R |

FOREIGN PATENTS OR APPLICATIONS

| 1,464,801 | 11/1966 | France | 24/16 PB |
| 207,189 | 6/1959 | Germany | 248/74 PB |

Primary Examiner—Paul R. Gilliam
Attorney—Raymond J. Eifler

[57] ABSTRACT

A compressible plastic conduit for receiving a plurality of wires and a plastic belt for compressing the conduit and retaining the wires in a fixed position relative to said conduit.

3 Claims, 7 Drawing Figures

PATENTED JUL 3 1973 3,742,559

INVENTORS.
STEPHEN PUNAKO
& GEORGE J. SWANSON
BY
R. J. Eifler
ATTORNEY

PLASTIC CABLE SUPPORT

CROSS REFERENCE TO RELATED APPLICATIONS

This application discloses material similar to that disclosed in application (ELC 71/10-A) entitled "Electrical Connector with Extended Cable Support", filed concurrently with this application.

BACKGROUND OF THE INVENTION

This invention relates to plastic conduits for retaining an electrical cable and/or a plurality of electrical wires. The invention is particularly useful when connected to an electrical connector to remove the stresses that would normally be applied to the connection of the connector contacts and wires by forces external to the connector operating on the wires.

It has been a continuing problem to prevent forces applied to a cable from being transmitted to an electrical connector associated therewith. However, most of the devices devised to avoid this problem are costly, complicated, and generally require too many additional components to be added to the connector to avoid the problem. An example of one such device to prevent the transmission of the forces applied to a cable to the connector associated therewith is a metal clamp which is attached to the housing of the connector by a retaining ring. Such a clamp had to be machined and required nuts and bolts to compress the clamp into the cable. In many instances, the clamp was tightened too much causing the rigid metal clamp to cut into and sometimes through the cable. Certainly this is undesirable as the electrical signals traveling through the wires are conducted to the connector body, and, where a high voltage is involved, a hazardous condition exists. Therefore, prior art cable support devices do not satisfactorily transmit radial and axial forces away from the connector contact-wire junction.

SUMMARY OF THE INVENTION

This invention provides a compressible sleeve of simple construction, and a plastic belt for compressing the sleeve to a desired size.

The invention is a plastic conduit characterized by a plurality of axial slots; and a plastic belt, for compressing that portion of the conduit having the slots therein, characterized by a plurality of mating ridges that interlock when tension is applied in the same direction thereto, thereby causing the belt to lock in a fixed position.

In one embodiment of the invention, the plastic cable support comprises: a frusto-conical conduit having a cylindrical portion at both ends thereof and a plurality of axial slots that extend from the smaller opening toward the larger opening, the slots permitting the compressing of the cylindrical portion at the smaller end of the conduit whereby the size of the smaller opening may be reduced; and a belt having a plurality of ridges extending along one surface of the belt, a larger cross-sectional area at one end portion of the belt than the remaining end portion, and a buckle disposed at one end thereof, the buckle having an opening therein larger in size than twice the cross-sectional area of the smaller remaining end portion of the belt but smaller in size than the combined cross-sectional area of the larger end and the remaining end portion so that both end portions of the belt may not pass through said buckle together whereby when both of the end portions of the belt are drawn into the buckle together, the teeth in both of the end portions engage each other and force the belt into pressurized contact with the inside of the buckle thereby preventing further movement of the end portions of the belt into the buckle.

Accordingly, it is an object of this invention to provide an inexpensive support for retaining an electrical cable or a plurality of electrical wires.

Another object of this invention is to provide an inexpensive device to be used in combination with an electrical connector to support the wires connected to the connector a predetermined distance away from the connector.

It is a still further object of this invention to provide a nonmetallic cable support.

It is another object of this invention to provide a cable support device that does not require the necessity of tools to attach the device to an electrical cable.

The above and other objects and features of the invention will become apparent from the following detailed description taken in conjunction with the accompanying drawings and claims which form a part of this specification.

DESCRIPTION OF THE PREFERRED EMBODIMENT

Figure 1:
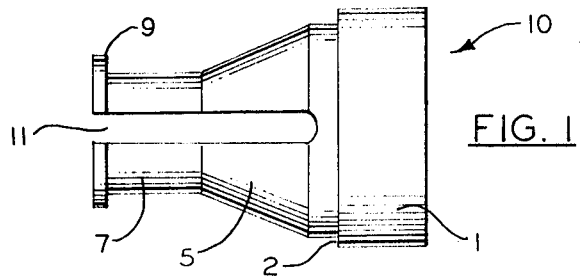
FIGS. 1 through 4 are illustrations of preferred embodiments of the cable support.

Referring now to the drawings, FIG. 1 illustrates a plastic conduit 10 having a configuration that embodies the principles of this invention. The conduit has a tapered portion 5 and cylindrical portions 1, 7 at each end of the conduit 10. Generally, the tapered portion 5 is frusto-conical in shape so that one end of the conduit has a large opening which is connected to a connector and the other end has a smaller opening which provides for the passage of wires to the connector. The larger cylindrical portion 1 of the conduit 10 includes a shoulder 2 which, in conjunction with a retaining ring (not shown), cooperates to fasten the conduit 10 to a connector. At the smaller cylindrical portion 7 of the conduit 10 there is a second shoulder 9 which, in conjunction with the tapered portion 5, operates to prevent the fastening means (FIG. 5) from moving axially beyond the cylindrical portion 7. The conduit 10 includes a slot 11 which extends from the opening in the smaller cylindrical portion 7 towards the opposite end 1. When the conduit 10 is fabricated completely from a rigid material, such as plastic, which cannot be compressed, the axial slot 11 allows the smaller opening in the conduit to be reduced when a pressure is applied to the cylindrical portion 7 of the conduit. Since the conduit 10 is comprised of a rigid material, it cannot be bent, and, hence, the wires in the conduit cannot be bent.

Figure 2:
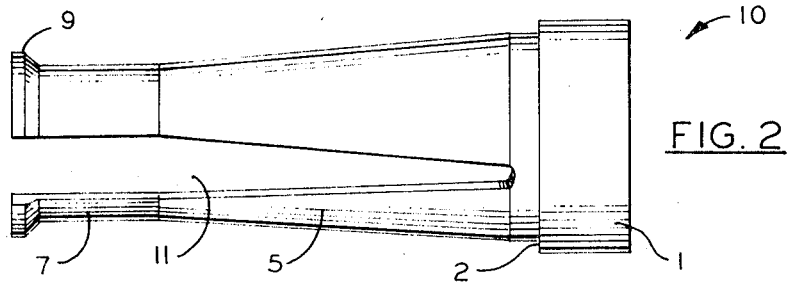

FIG. 2 is an elongated version of the conduit shown in FIG. 1. In this embodiment, the tapered portion 5 has a more gradual slope and extends further. In this embodiment, the entire conduit 10 is also comprised of rigid material, such as plastic, which is not compressible, therefore, it is necessary to have slot 11 in the conduit so that when pressure is applied to the cylindrical portion 7 the opening at the smaller end of the conduit is reduced.

Figure 3:

FIG. 3 illustrates an alternate embodiment which is a conduit 10 that may be divided into two functional portions. A rigid (e.g., plastic) cylindrical portion 1 having a shoulder 2 and an extension 12 and a compressible portion 4 which may be comprised of a resilient or deformable material that may be repeatedly compressed. The resilient material 4 has an inner diameter about the same as the diameter of the extension 12 so that the compressible material 4 may be permanently secured to the extension 12 of the rigid portion 1 of the conduit 10. No axial slots are necessary in this embodiment in view of the fact that the end portion is comprised of a compressible material, as opposed to the previous embodiments where the amterial was not compressible but the conduit in general was because of the axial slots.

Figure 4:
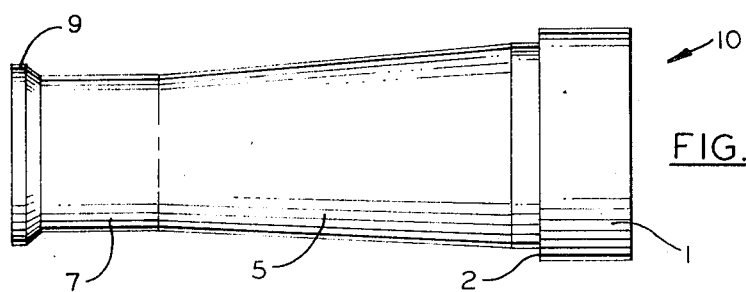

FIG. 4 illustrates a conduit that is generally frusto-conical in shape and does not have any axial slots. When fabricated entirely from plastic this type of support would be designed so that the opening at the smaller end of the frustoconical conduit would be a specific size to receive a predetermined number of wires going to a connector. Although this type of conduit prevents radial forces from being transmitted to the connector, it does not do much to reduce any axial forces that would be applied to wires passing through the conduit from reaching the contacts in the connector. Therefore, in applications where axial forces applied to the wires is not a factor, this type of conduit, since it requires one less operation to fabricate (no slot), would be most suitable as it is less expensive and would do the job. As an alternate embodiment the smaller end portion 7 could be comprised of a resilient material, or the end portion 7 and tapered portion 5 could be comprised of a resilient material so that the conduit 10 could be radially compressed against a plurality of wires passing therethrough.

Figure 5:
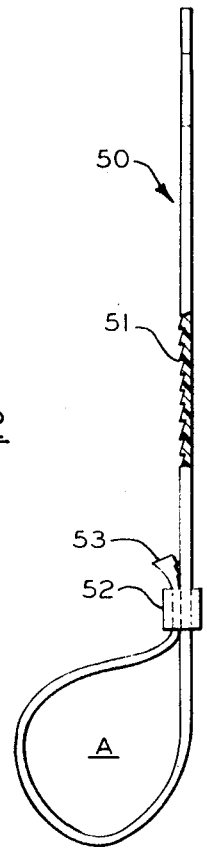
FIG. 5 is a plastic belt which is used to tie down the cable support in a fixed position around the wires passing through the support.

FIG. 5 is one preferred device for compressing the conduit which incorporates the principles of this invention. This particular means for compressing the conduit 10 is a belt of plastic 50 that has a plurality of directional ridges or teeth 51 along one surface thereof, a friction buckle 52, and an enlarged end portion 53. The opening in the buckle 52 is larger in size than twice the cross-sectional area of the smaller remaining end portion of the belt but smaller in size than the combined cross-sectional area of the larger end portion 53 and the smaller end portion so that both portions of the belt may not pass through the buckle together whereby when both of the end portions of the belt are drawn into said buckle together, the teeth 51 in both of the end portions engage each other and force the belt into pressurized contact with the inside of the buckle thereby preventing further movement of the end portions of the belt into said buckle. When the belt is tightened around the conduit 10, the teeth 51 engage the teeth in the end portion 53 so that the belt cannot move in a direction that will enlarge the loop A. This results from the end portion 53 being drawn into the friction buckle 52 so that the teeth of the end portion 53 engage the teeth in another portion of the belt to stop the movement of the belt in a direction that would enlarge the loop A. Removing the expansion force from the loop A allows the end portion 53 to move outside of the friction buckle 52 and therefore allow the belt to move in either direction as the teeth 51 are no longer engaged.

Figure 6:
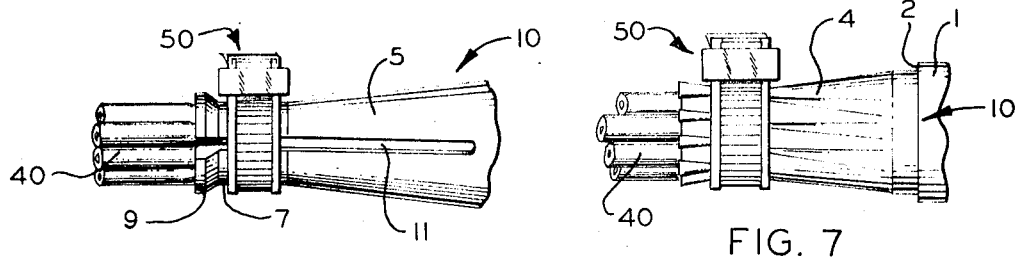
FIG. 6 illustrates the cable support shown in FIG. 2 attached to and supporting an electrical cable.

FIG. 6 illustrates the functional advantages of the plastic conduit and how it is used to retain a plurality of electrical wires. The conduit 10 being comprised of a rigid material, protects the wires 40 within the conduit from being subjected to radial and axial forces. When the cylindrical end portion 7 of the conduit is compressed by some means, such as the tie down strap 50, the wires 40 extending through the conduit are retained in fixed positions.

Figure 7:
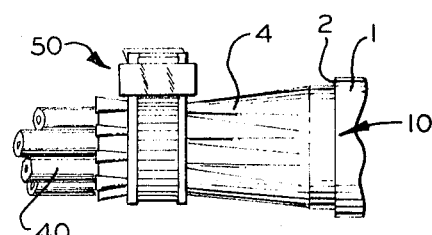
FIG. 7 illustrates the cable support shown in FIG. 3, which is comprised of a deformable material, attached to a plurality of electrical conductors.

FIG. 7 illustrates how the compressible portion 4 of a conduit 10 is compressed by the belt 50 to retain the wires 40 in fixed positions.

While a preferred embodiment of the invention has been disclosed, it will be apparent to those skilled in the art that changes may be made to the invention as set forth in the appended claims, and, in some cases, certain features of the invention may be used to advantage without corresponding use of other features. For example, the general shape of the conduit shown has been cylindrical, however, the conduit may take many physical configurations, e.g., rectangular, octagonal, etc. while the objects of this invention may still be obtained. Accordingly, it is intended that the illustrative and descriptive materials herein be used to illustrate the principles of the invention and not to limit the scope thereof.

Having described the invention, what is claimed is:

1. In combination with an electrical connector of the type that receives several electrical wires at one end of the connector and includes means attached to said one end of said connector for supporting said wires at said one end of said connector, the improvement wherein said support means comprises:

a frusto-conical conduit having a larger cylindrical conduit portion at one end and a smaller cylindrical conduit portion at the other end and a plurality of axial slots that extend from the opening in said smaller cylindrical conduit portion and into said frusto-conical portion, said larger cylindrical portion mounted on said one end of said connector with said several wires extending through said conduit, said slots permitting the compressing of said smaller cylindrical conduit portion around said wires whereby the size of said smaller opening may be reduced and said wires retained therein, said larger cylindrical conduit portion at said larger end of said frusto-conical conduit including a shoulder on the larger portion of said conduit and said smaller cylindrical conduit portion terminating in a shoulder on the outside thereof.

2. In combination with an electrical connector of the type that receives several electrical wires at one end of the connector and includes means attached to said one end of said connector for supporting said wires at said one end of said connector, the improvement wherein said support means comprises:

a continuous sleeve having alternating portions of varying compressibility for receiving and retaining several electrical wires, said sleeve having one end portion more flexible than the other end portion, said sleeve having a passage sized to receive several electrical wires; and means for compressing said one end portion whereby said electrical wires extending through said conduit are retained in fixed position.

3. In combination with an electrical connector of the type that receives several electrical wires at one end of the connector and includes means attached to said one end of said connector for supporting said wires at said one end of said connector, the improvement wherein said support means comprises:

a sleeve for receiving and retaining several electrical wires, said sleeve comprising:

an axially rigid conduit having a first end portion including a shoulder on the outside thereof and a tapered portion tapering away from said first end portion and terminating at a second end portion having an opening smaller than the opening in said first end portion, said second end portion and said tapered portion having at least one axial slot therein extending from the smaller opening in said second end portion so that said tapered portion is radially compressible, said second end portion including a shoulder on the outside end thereof; and means for compressing said tapered portion of said conduit so that said electrical wires extending through said conduit are retained in fixed positions, said compressing means located between said shoulder on said second end portion and said tapered end portion.

* * * * *

Disclaimer 3,742,559.—*Stephen Punako*, Bainbridge, and *George J. Swanson*, Sidney, N.Y. PLASTIC CABLE SUPPORT. Patent dated July 3, 1973. Disclaimer filed July 30, 1973, by the assignee, *The Bendix Corporation*.
Hereby disclaims the term of the patent subsequent to Mar. 13, 1990.
[*Official Gazette July 8, 1975.*]